Jan. 17, 1928.

W. C. TROUT 1,656,456

GRIPPING DEVICE FOR ROTARIES

Filed Sept. 27, 1926    2 Sheets-Sheet 1

W.C.Trout   Inventor

By Jesse R. Stone

Attorney

Jan. 17, 1928.

W. C. TROUT 1,656,456

GRIPPING DEVICE FOR ROTARIES

Filed Sept. 27, 1926    2 Sheets-Sheet 2

W.C. Trout  Inventor

By Jesse R. Stone  Attorney

Patented Jan. 17, 1928.

1,656,456

UNITED STATES PATENT OFFICE.

WALTER C. TROUT, OF LUFKIN, TEXAS.

GRIPPING DEVICE FOR ROTARIES.

Application filed September 27, 1926. Serial No. 137,916.

My invention relates to gripping devices to be employed upon the rotary table for holding the pipe employed in well drilling.

In drilling wells by the rotary system of drilling, it has become customary to employ a hollow drill rod, the upper end of which is gripped by a device upon the rotary table and held non-rotably relative to the table. The upper end of the drill stem is ordinarily called the grief stem or Kelley joint. It is made with polygonal sides or with grooves cut in the stem so that it may interfit with the gripping device on the rotary table.

It is an object of my invention to provide a gripping means for the grief stem which will allow a free vertical movement of the said grief stem relative to the gripping means, but will prevent relative rotation between the two devices.

It is a further object to construct the gripping means so that it may be adjustable for different sizes of grief stem, and also so that it may be adjusted for wear. It is also desired that the device be particularly strong and simple in construction, and economical to manufacture.

Figure 1:
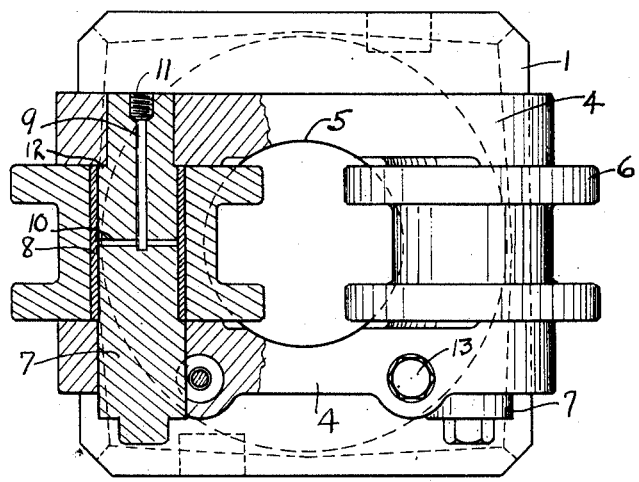
Figure 2:
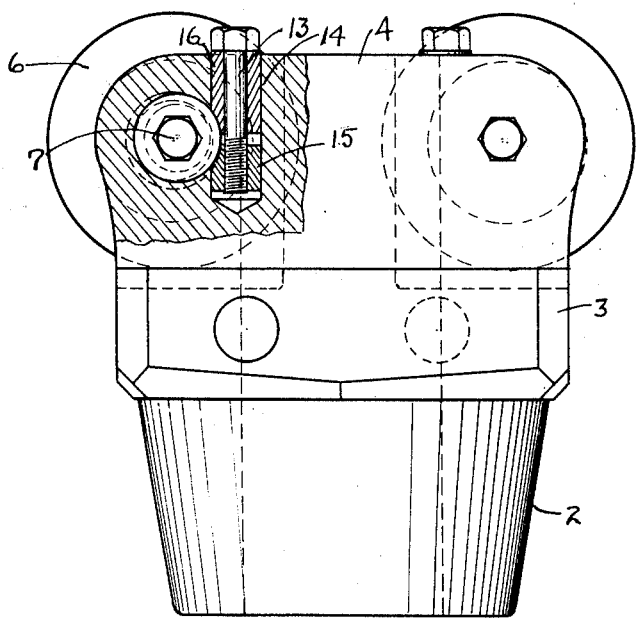
Figure 3:
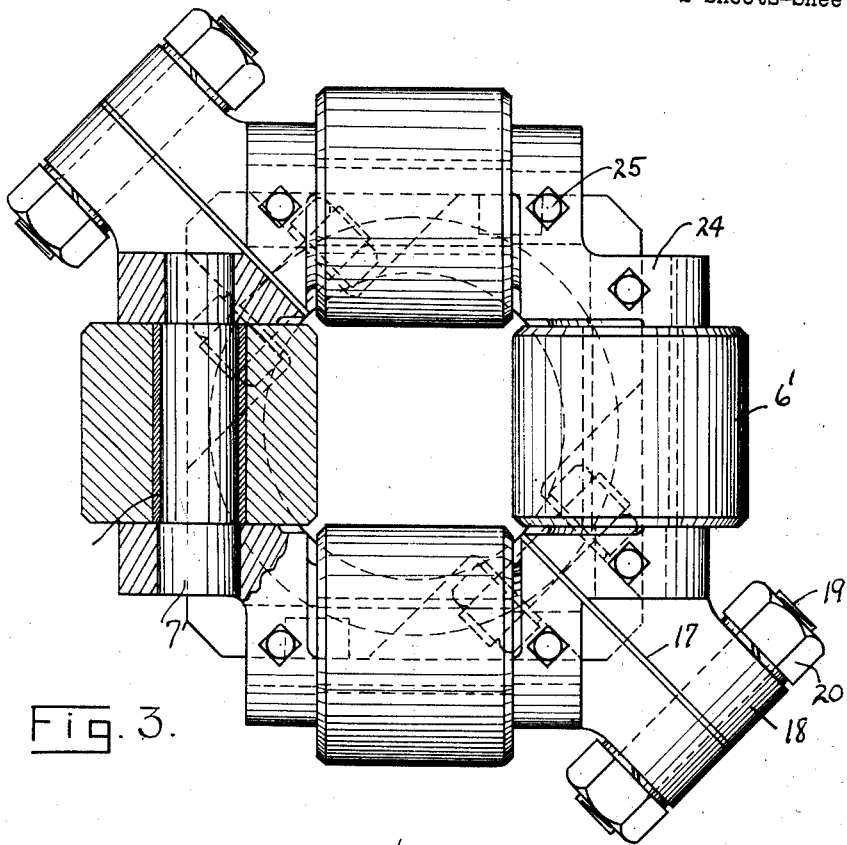
Figure 4:
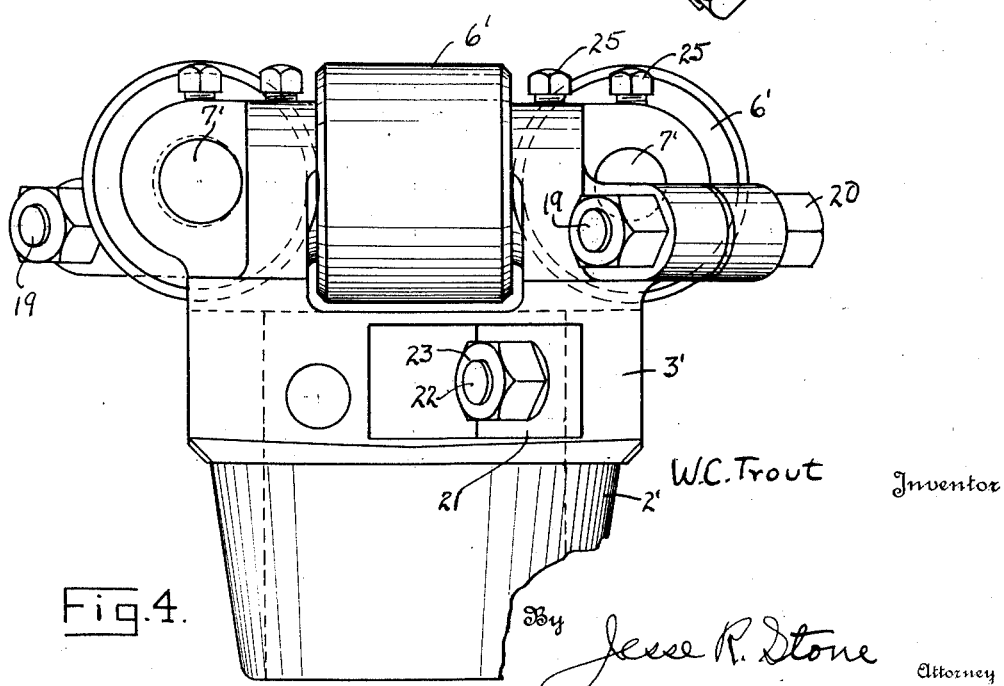

Referring to the drawing herewith, Fig. 1 is a top plan view of one form of the invention, certain parts being broken away in horizontal section for greater clearness. Fig. 2 is a side elevation of the gripping device with certain parts broken away for greater clearness. Fig. 3 is a top plan view similar to that shown in Fig. 1 illustrating a slightly different embodiment, and Fig. 4 is a side elevation of the device shown in Fig. 3. Like numerals of reference designate like parts in all views.

In carrying out the invention, it is to be understood that the rollers upon the gripping device may be arranged to grip a square grief stem, or may be arranged so that the periphery of the rollers will conform to the shape of the grief stem, as in the form shown in Figs. 1 and 2 where the grief stem is understood to be cross shaped in section. Furthermore, it is to be understood that the body of the gripping device in either embodiment may be made integral or of two sections held together by clamping means.

In Fig. 1 there is shown a gripping device, the body 1 of which is of one integral block or casting. This block is tubular and circular in shape at its lower end and is tapered at 2 to fit within the usual tapered seat of the rotary table. Above the tapered end the device is squared at 3 to fit the upper end of the opening in the rotary and be thus held to rotate with the rotary table.

The upper end of the block is formed with two opposite upwardly projecting supports 4, extending from one side to the other of the block and having their central inner faces cut away at 5 to allow the free passage of the grief stem through the block. These two supports 4 furnish a mounting for the gripping rollers 6 which are of such length as to fit between the two supporting members, as shown best in Fig. 1. The said rollers are mounted upon bearing shafts 7 passing centrally through the rollers and a bushing sleeve 8 is preferably mounted upon the shaft within the roller body to provide for wear during the operation of the device. To lubricate the said bearings an oil duct 9 is formed in the end of each roller shaft leading to a centrally branching duct 10 by which the lubricant may be fed to the bearings. The outer end of the duct 9 may be closed by a threaded plug indicated at 11 in Fig. 1.

It is desired to so mount the rollers 6 that they may be adjustable toward and away from the grief stem during the operation of the device. This often becomes necessary where there is wear between the rollers and the brief stem which must be taken up by the adjustment of the rollers, and this is also necessary where grief stems are not all the same size. To make the rollers adjustable, the shafts are formed with a central eccentric portion 12, thus making it possible by rotating the shaft 7 to throw the roller slightly to one side or the other of the axis of the bearing shaft 7.

To clamp the shaft 7 in adjustable position, there is a locking bolt 13 mounted adjacent the ends of each of the shafts 7. This bolt fits within a recess 14 of a size materially larger than the said bolt; said recess having a threaded plug 15 in the lower end thereof to receive the lower end of said bolt. The sleeve 16 on the bolt 13, is formed to fit against the side of the shaft 7 and may be forced tightly against the shaft to prevent further rotation by the tightening of the bolt 13 within the plug 15. Thus it is possible to adjust the pressure of the sleeve 16 against the shaft by the operation of the bolt 13 in an obvious manner.

In the embodiment of the invention shown in Figs. 3 and 4, the body of the block is formed with the tapered lower end 2' and a squared section 3′ above the tapered portion. The body of the block is divided diametrically on the line 17 and at the ends of the plane of division, lateral ears 18 are formed upon each of the halves of the block, and these ears are formed with an opening to receive a bolt 19 extending through said ears and adapted to clamp the same together by means of nuts 20.

To further assist in clamping the two halves of the block together, recesses 21 are formed in opposite sides of the squared head 3′ so as to allow the passage of a bolt 22 across from one recess to the other, said bolts being clamped in position by nuts 23.

The rollers 6′ in this embodiment are cylindrical with the opposite ends beveled slightly, as is shown in the drawing. Each roller is mounted between supporting members 24 upon shafts 7′. Said shafts are supported at their ends in the supports 24 and may be made eccentric as in the previous embodiment.

In the drawing the said shafts 7′ are shown as held against rotation by set screws 25 extending vertically downward through the supporting members 24 to contact with the shafts at each end thereof.

In the modification it is apparent that the rollers may be adjusted to various sizes of grief stem by the means of the eccentric shafts 7′ or by spacing the two halves of the block slightly apart by means of spacing members when the two halves of the block are clamped in position.

In the use of this device the assembled block may be fitted about the grief stem and may be dropped into the seat made therefor in the rotary table and will grip the pipe securely so that it will be compelled to rotate with the rotation of the table. The rollers will allow the stem to move vertically thereon so as to accommodate the downward progress of the drill during its operation, but will hold it securely in such manner that it may be rotated. The block thus formed is simple in construction and may be employed economically in drilling.

Further objects and advantages thereof will be apparent to those skilled in the art without further description.

What I claim as new, and desire to protect by Letters Patent is:

1. A gripping device for rotaries comprising a block squared to fit a rotary table, a plurality of supports thereon, shafts in said supports, eccentric bearings on said shafts, a single roller on each of said bearings, the peripheries of said rollers being shaped to fit against a grief stem, and means to secure said shafts in adjusted position.

2. A gripping device for rotaries comprising a block adapted to fit non-rotatably in a rotary table, four rollers each mounted rotatably on a separate shaft on said block, eccentric bearings on said shafts, means to adjust said bearings, and means to lock said shafts in adjusted position.

3. A gripping device for rotaries comprising a tubular block shaped to fit nonrotatably within a rotary table, said block being divided longitudinally into two parts, means to clamp said parts together, rollers supported on shafts on said block, said shafts having eccentric bearings, whereby the rotative movement of said shafts will adjust said rollers laterally.

4. A gripping device for rotaries comprising a tubular block squared on its upper end to fit within a rotary table, said block being divided diagonally of said upper end, means to clamp the parts of said block together, rollers mounted on said block and means to adjust said rollers in the manner described.

5. A gripping device for rotaries comprising a tubular block having its upper end squared to fit within a rotary table, supporting members thereon, shafts rotatable in said supports, eccentric bearings on said shafts, rollers on said bearings, and means to fix said shafts in adjusted position.

In testimony whereof I hereunto affix my signature this 22nd day of September, A. D. 1926.

WALTER C. TROUT.